United States Patent [19]

O'Neill

[11] Patent Number: 4,557,638
[45] Date of Patent: Dec. 10, 1985

[54] PNEUMATIC TUBE CONVEYOR

[76] Inventor: Paul J. O'Neill, 1095 Bel Marin Keys Blvd., Novato, Calif. 94947

[21] Appl. No.: 597,494

[22] Filed: Apr. 6, 1984

[51] Int. Cl.$^4$ .............................................. B65G 51/06
[52] U.S. Cl. ..................................... 406/186; 406/190
[58] Field of Search ................................. 406/184–191

[56] References Cited

U.S. PATENT DOCUMENTS

| | | | |
|---|---|---|---|
| 839,646 | 12/1906 | Roberts | 406/185 X |
| 2,127,500 | 8/1938 | Cross | 406/188 |
| 2,176,439 | 10/1939 | Taylor et al. | 406/191 |
| 3,101,182 | 8/1963 | Todt et al. | 406/187 X |
| 3,231,218 | 1/1966 | Tearne | 406/186 |
| 3,237,884 | 3/1966 | Grosswiller et al. | 406/186 |
| 3,297,277 | 1/1967 | MacKenzie | 406/186 |

Primary Examiner—Jeffrey V. Nase
Attorney, Agent, or Firm—Melvin R. Stidham

[57] ABSTRACT

A pneumatic tube conveyor system including tubing of rectangular cross-section with both elevational and lateral bends. The carriers are generally rectangular in outline with a pair of generally cylindrical fore and aft transverse members interconnected by a narrower and thinner intermediate section. The ends of the transverse members are curved on radii equal to one-half the longer inside dimension of the tubing and the tops and bottoms are curved on radii equal to one-half the smaller dimensions so that diametrically opposite sides are in contact with the tubing walls as they negotiate bends.

6 Claims, 6 Drawing Figures

PNEUMATIC TUBE CONVEYOR

BACKGROUND OF THE INVENTION

Pneumatic tube conveyors are in common use in stores, apartment buildings, hospitals, office buildings and the like for carrying messages and supplies and delivering mail between various points in the buildings. Such systems operate by generating a pressure differential between two points, either by pressurizing at the sending point or producing a vacuum at the receiving point. The carriers have to fit relatively snugly within the tube so that they can function as free pistons to be projected by the pressure differential across them. Because the carriers fit fairly snugly, changes in direction require bends of extremely large radius, which often require that curved sections of tubing extend into space which could be utilized otherwise.

Conventionally, pneumatic tube conveyors are circular in cross-section to facilitate sealing around the carriers. However, this requires that envelopes, photographs and the like of larger dimension than the diameter of the carrier be rolled or curled in order to fit within the carrier. It would be advantageous to have a rectangular shaped carrier to travel through a pneumatic tube of like configuration, but the difficulty lies in the condition encountered when the carrier is made to travel through tubing bends, as described above.

OBJECTS OF THE INVENTION

It is an object of this invention to provide a pneumatic tube conveyor of rectangular cross-section capable of changing directions in short radius bends.

It is a further object of this invention to provide a pneumatic conveyor of rectangular cross-section capable of short radius bends in any axis.

Other objects and advantages of this invention will become apparent from the description to follow, particularly when read in conjunction with the accompanying drawing.

SUMMARY OF THE INVENTION

In carrying out this invention, I provide a pneumatic conveyor tube of rectangular cross-section. The carrier is of raft-like configuration with cylindrical, fore and aft transverse members, the tops and bottoms of which are curved on a radius equal to one-half the shorter dimension of the tubing and the ends of which are curved on a radius equal to one-half the long dimension of the tubing so that the transverse members will maintain contact with the inner walls of the tubing as they move around curves. The transverse members are joined by a rectangular intermediate section which is smaller in both dimensions so as not to engage the tubing as the transverse members negotiate turns.

DESCRIPTION OF A PREFERRED EMBODIMENT

Figure 2:
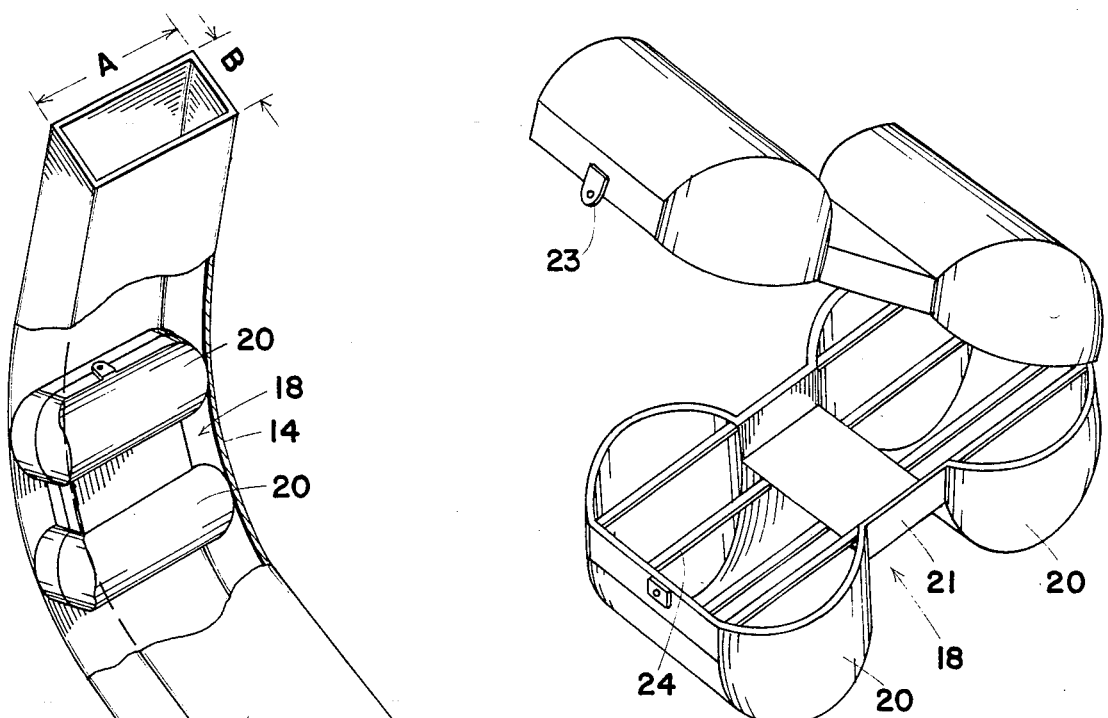
FIG. 2 is a view in perspective of a carrier to be propelled through the conveyor tube.
Figure 1:
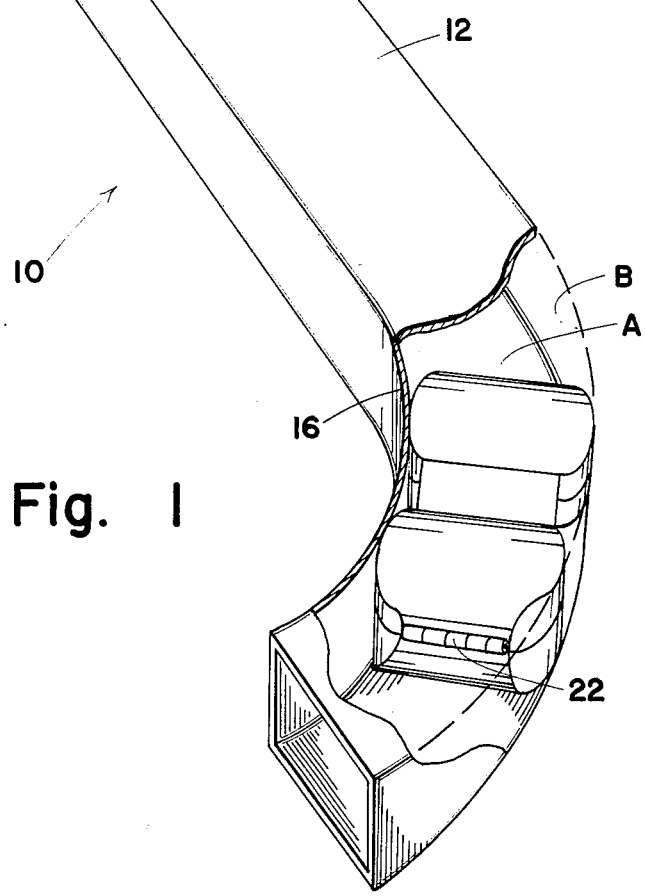
FIG. 1 is a view in perspective, partially broken away showing a section of the pneumatic conveyor of this invention.

Referring now to FIGS. 1 and 2 with greater particularity, the pneumatic tube conveyor 10 of this invention comprises tubing 12 of rectangular cross-section with a long dimension A and a short dimension B, and having both elevational bends 14, transverse to the plane of the long side A, and lateral bends 16 in the plane of the long side A.

The carrier 18 is generally rectangular in outline of raft-like configuration with parallel, generally cylindrical fore and aft transverse members or "floats" 20 interconnected by an intermediate rectangular section 21 of smaller dimension.

The transverse members are interconnected at one pair of adjacent ends by a hinge 22 and a latch 23 at the other end holds the carrier closed during transit through the tubing 12. Ribs 24 may be provided across each member 22 for reinforcement and to provide a flat support for large envelopes, sheets and the like.

Figure 3:
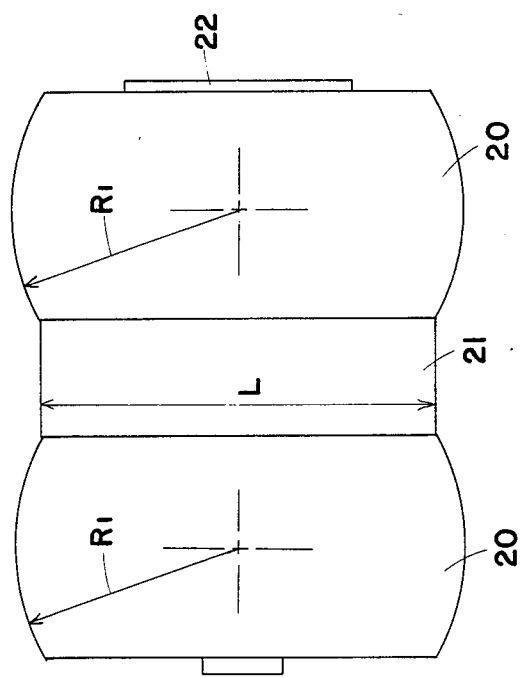
FIG. 3 is a top plan view of the carrier.
Figure 4:
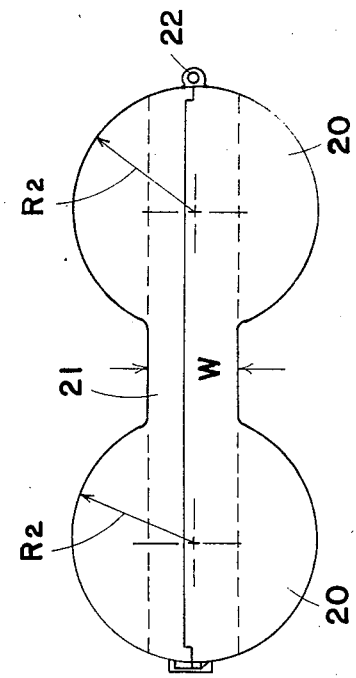
FIG. 4 is a side view of the carrier.

Referring to FIG. 3, the lateral radii $R_1$ of the fore and aft transverse members 20 are equal to one-half the large dimension A of the tubing so that as the carrier 18 negotiates a lateral bend 16, diametrically opposite end surfaces of each transverse member 20 remain in contact with the inner surfaces of the short side B of the rectangular tubing 12. Similarly, the top and bottom radii $R_2$ of the transverse section 20 must be equal to one-half the short dimension B of the rectangular tubing so that as the carrier 18 negotiates a lateral bend or curve 14 diametrically opposite sides of the section 20 will remain in contact with the large sides A of the rectangle. The length L and width W of the intermediate section 21 are determined, taking into consideration both the length of the carrier 14 and the sharpness of the tubing bend radii. That is, there must be some clearance between the surface of the intermediate section 21 and the tube inside surfaces when the carrier is fully engaged in the tightest bend section.

As a further limitation, the chordal length of each section 20 across the small radius curve $R_2$ should be equal to the chordal length of the section 20 taken across the larger radius curves $R_1$ so that the surface thereof will not break contact with the sides B as the carrier 18 negotiates a lateral curve 16. As a practical matter, this means that the smaller radius $R_2$ and the narrow tube dimension B is established only after the larger radius $R_1$ and its related chordal length has been established.

Figure 5:
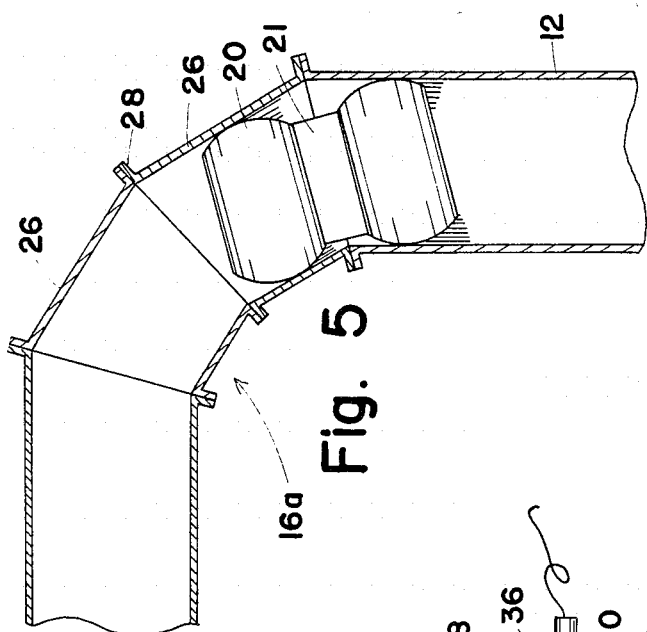
FIG. 5 is a partial section view of a turning section of conveyor.

The rectangular cross-section of the tubing 12 affords certain design advantages in the manufacture and fabrication of tube bend sections, such as section 16a, shown in FIG. 5. As there shown, it is possible to use angular sections 26 having flanged faces 28 to make the required directional changes. These sections may be angulated to as great as a thirty degree included angle without creating interference between the carrier section 21 and the mating inside corners at the flanges 28, and each section 26 provides uniform internal dimensions and, therefore, continuous contacts with the arcuate edges of the section 20 of the carrier 18. These sections may be fabricated and joined in accordance with typical heating ducts of sheet metal design to maintain their air-tight characteristics. The tube design characteristic of FIG. 5 provides a unique fabrication advantage in that all sections, straight or angular may be band sawed from a single cross section straight run.

Figure 6:
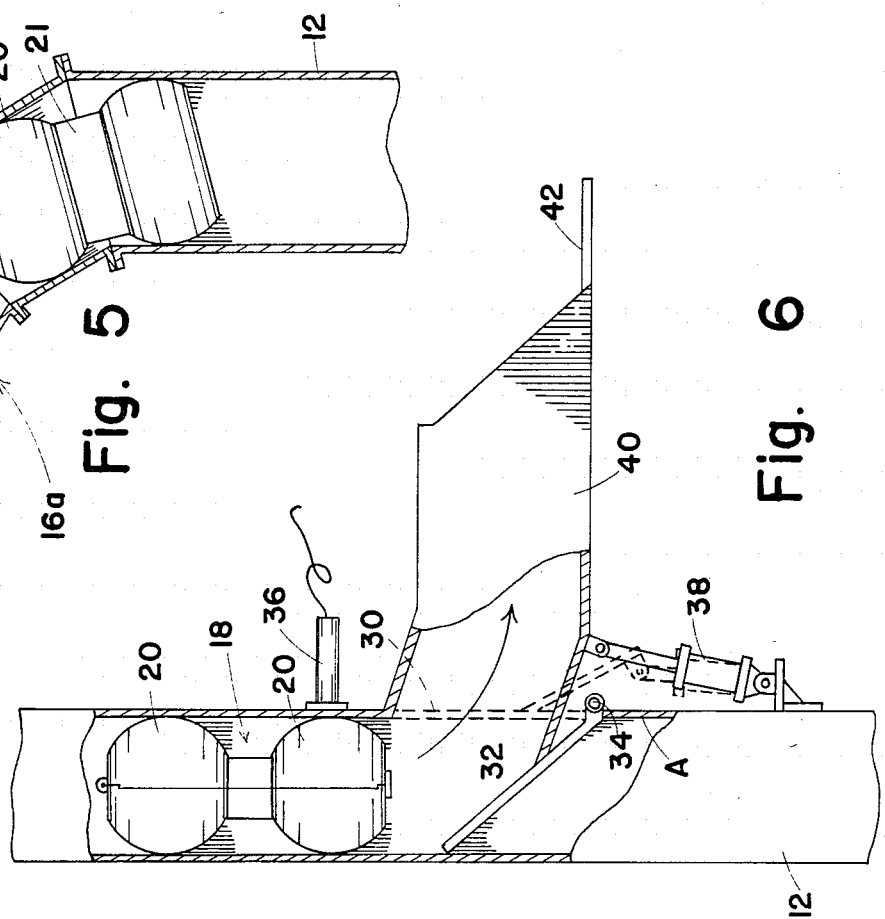
FIG. 6 is an elevation view partially broken away showing a type of conveyor tube branch line.

A further advantage in the rectangular cross-section tube 12 resides in the facility with which the carrier 18 can enter and exit at mid-course locations of a tubing run. As shown in FIG. 6, the tubing 12 may be provided with an opening 30 that is normally closed by a gate 32, which is pivoted at 34 to the tubing wall A. A carrier 18 may be equipped with an optical read bar code that is identified by an optical reader 36 located in the conveyor tube 12. When the appropriate code is read, the reader 36 will activate a pneumatic cylinder 38 which operates the gate 32 to swing it to the position shown in full lines in FIG. 6, diverting the carrier 18 to a branch line 40 and pickup station 42.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A pneumatic tube conveyor system comprising:
   a length of tubing;
   said tubing being rectangular in cross-section and having a short dimension and a long dimension; and including
   at least one first direction-changing section of tubing curved with short dimensions thereof disposed along radii of said curve;
   and hollow carriers to be transported through said tubing;
   each hollow carrier comprising:
   a pair of generally cylindrical fore and aft members the axes of which are parallel and transverse to the direction of movement of said carrier;
   each said cylindrical member being of a radius equal to one-half said short dimension to engage opposing surfaces of said tubing on said long dimension thereof and of a length equal to said long dimension, so that ends thereof engage opposing inner surfaces of said tubing on said short dimension thereof; and
   a generally rectangular intermediate section interconnecting said fore and aft generally cylindrical members and being of a thickness and width less than said short and long dimensions, respectively.

2. The pneumatic tube system defined by claim 1 wherein:
   the thickness of said intermediate section is such that said intermediate section is free of engagement with the inner surface of said tubing as said carrier passes through said first direction-changing section.

3. The pneumatic tube system defined by claim 1 being further characterized in that:
   the ends of said fore and aft generally cylindrical members are curved about axes perpendicular to the axes thereof on radii equal to one-half said long dimension.

4. The pneumatic tube system defined by claim 3 wherein:
   there is at least one second direction-changing section of tubing curved with long dimensions thereof disposed along radii of said curve.

5. The pneumatic tube system defined by claim 1 including:
   a tubular branch line opening from said length of tubing; and
   a gate pivotally mounted to move between a normal position forming a continuation of a wall of said length of tubing and blocking off said branch line, and a second position extending across said length of tubing and opening said branch line.

6. A pneumatic tube conveyor system comprising:
   a length of tubing;
   said tubing being rectangular in cross-section and having a short dimension and a long dimension; and including
   at least one lateral direction-changing section of tubing curved with long dimensions thereof disposed along radii of said curve;
   and hollow carriers to be transported through said tubing;
   each hollow carrier comprising:
   a pair of generally cylindrical fore and aft members the axes of which are parallel and transverse to the direction of movement of said carrier;
   each said cylindrical member being of a diameter equal to said short dimension and of a length equal to said long dimension;
   each of said cylindrical members having cylindrical end surfaces curved about axes perpendicular to the axes of said each member on radii equal to one-half said long dimension; and
   a generally rectangular intermediate section interconnecting said fore and aft members and being of a thickness and width less than said short and long dimensions, respectively.

* * * * *